US011082758B2

(12) United States Patent
Balakrishnan et al.

(10) Patent No.: US 11,082,758 B2
(45) Date of Patent: Aug. 3, 2021

(54) SYSTEM AND METHOD FOR OBTAINING VEHICLE TELEMATICS DATA

(71) Applicants:Cambridge Mobile Telematics Inc., Cambridge, MA (US); Discovery Limited, Sandton (ZA)

(72) Inventors: Hari Balakrishnan, Belmont, MA (US); Lewis David Girod, Arlington, MA (US); Ilan Ossin, Johannesburg (ZA)

(73) Assignees: Cambridge Mobile Telematics Inc., Cambridge, MA (US); Discovery Limited, Sandton (ZA)

( * ) Notice: Subject to any disclaimer, the term of this patent is extended or adjusted under 35 U.S.C. 154(b) by 0 days.

(21) Appl. No.: 16/559,726

(22) Filed: Sep. 4, 2019

(65) Prior Publication Data

US 2019/0394544 A1  Dec. 26, 2019

Related U.S. Application Data

(63) Continuation of application No. 16/398,083, filed on Apr. 29, 2019, now Pat. No. 10,440,451, which is a
(Continued)

(51) Int. Cl.
*H04Q 9/00* (2006.01)
*G07C 5/00* (2006.01)
(Continued)

(52) U.S. Cl.
CPC ............... *H04Q 9/00* (2013.01); *G07C 5/008* (2013.01); *G07C 5/0858* (2013.01); *G01C 21/16* (2013.01);
(Continued)

(58) Field of Classification Search
CPC .. H04Q 9/00; H04Q 2209/00; H04Q 2209/10; H04Q 2209/20; H04Q 2209/40;
(Continued)

(56) References Cited

U.S. PATENT DOCUMENTS 6,363,308 B1 * 3/2002 Caruso ................. B60R 21/013
                                                            180/271
6,501,390 B1   12/2002 Chainer
(Continued)

FOREIGN PATENT DOCUMENTS

JP   2000205892   7/2000
JP   2009122946   6/2009
(Continued)

OTHER PUBLICATIONS

U.S. Appl. No. 14/529,812, filed Oct. 31, 2014—Published 20150312655.
(Continued)

*Primary Examiner* — Franklin D Balseca
(74) *Attorney, Agent, or Firm* — Fish & Richardson P.C.

(57) ABSTRACT

A sensor tag which in use will be affixed to a vehicle for obtaining vehicle telematics data includes a battery for powering the tag and a processor running executable code to process accelerometer data. An accelerometer measures the acceleration of the tag and thereby of the vehicle, and also controls the operation of the processor. A memory is used for storing a unique tag identifier of the tag and for storing trip data including information about trips and acceleration data. Finally, a communication module is used for short range wireless communication with a mobile communications device located in the vehicle via a short range wireless communications protocol, the communication module transmitting the tag's unique identifier and a sequence of time stamped acceleration data. The mobile communications
(Continued)

device obtains GPS data, combines this with the acceleration date and transmits this to a server for analysis.

13 Claims, 9 Drawing Sheets

Related U.S. Application Data continuation of application No. 14/529,812, filed on Oct. 31, 2014, now abandoned.

(60) Provisional application No. 61/985,644, filed on Apr. 29, 2014.

(51) Int. Cl.
*G07C 5/08* (2006.01)
*G01C 21/16* (2006.01)
*G06Q 40/08* (2012.01)

(52) U.S. Cl.
CPC ......... *G06Q 40/08* (2013.01); *H04Q 2209/00* (2013.01); *H04Q 2209/10* (2013.01); *H04Q 2209/20* (2013.01); *H04Q 2209/40* (2013.01); *H04Q 2209/50* (2013.01)

(58) Field of Classification Search
CPC .. H04Q 2209/50; G07C 5/008; G07C 5/0858; G01C 21/16; G06Q 40/08
See application file for complete search history.

(56) References Cited

U.S. PATENT DOCUMENTS

| | | | |
|---|---|---|---|
| 6,546,492 B1 | 4/2003 | Walker et al. | |
| 8,269,617 B2 | 9/2012 | Cook | |
| 8,405,502 B2 | 3/2013 | Teague | |
| 8,457,880 B1 | 6/2013 | Malalur et al. | |
| 8,515,505 B1 | 8/2013 | Pattikonda | |
| 8,611,321 B2 | 12/2013 | Herrala et al. | |
| 8,635,091 B2 | 1/2014 | Amigo | |
| 8,799,034 B1* | 8/2014 | Brandmaier | G07C 5/008 705/4 |
| 8,973,091 B2* | 3/2015 | Ting | H04L 63/08 726/1 |
| 9,070,100 B2 | 6/2015 | Davidson | |
| 9,108,583 B2* | 8/2015 | Wanami | B60K 28/14 |
| 9,270,520 B2* | 2/2016 | Dina | H04L 41/00 |
| 9,285,294 B2* | 3/2016 | Jordan, Jr. | G06F 17/00 |
| 9,338,605 B2* | 5/2016 | Guba | H04W 4/027 |
| 9,427,592 B2* | 8/2016 | Wu | H04W 4/80 |
| 10,303,868 B2* | 5/2019 | Weber | G06F 21/6218 |
| 2001/0034577 A1 | 10/2001 | Grounds et al. | |
| 2002/0024450 A1 | 2/2002 | Townsend | |
| 2006/0161377 A1 | 7/2006 | Rakkola | |
| 2006/0205489 A1 | 9/2006 | Carpenter et al. | |
| 2006/0238422 A1 | 10/2006 | Schantz | |
| 2007/0229248 A1 | 10/2007 | Mott | |
| 2007/0247282 A1 | 10/2007 | Olsen | |
| 2008/0065290 A1 | 3/2008 | Breed | |
| 2008/0231446 A1 | 9/2008 | Cresto | |
| 2009/0102665 A1 | 4/2009 | Baranowski et al. | |
| 2009/0119657 A1 | 5/2009 | Link | |
| 2010/0130182 A1 | 5/2010 | Rosen | |
| 2010/0190469 A1* | 7/2010 | Vanderveen | H04L 12/14 455/406 |
| 2010/0289663 A1 | 11/2010 | Savchenko | |
| 2010/0305814 A1 | 12/2010 | Ichikawa | |
| 2012/0245839 A1 | 9/2012 | Syed et al. | |
| 2013/0021174 A1 | 1/2013 | Silzer | |
| 2013/0041585 A1 | 2/2013 | Czompo et al. | |
| 2013/0041623 A1 | 2/2013 | Kumar et al. | |
| 2013/0197776 A1 | 8/2013 | Davidson et al. | |
| 2013/0210405 A1 | 8/2013 | Whipple et al. | |
| 2014/0164570 A1 | 6/2014 | Hanley et al. | |
| 2014/0198618 A1 | 7/2014 | Cary et al. | |
| 2014/0266654 A1* | 9/2014 | Parker | B60R 25/00 340/426.25 |
| 2014/0278206 A1 | 9/2014 | Girod | |
| 2015/0045983 A1* | 2/2015 | Fraser | G07C 5/008 701/1 |
| 2015/0177362 A1* | 6/2015 | Gutierrez | B60R 25/245 701/519 |
| 2015/0223278 A1* | 8/2015 | Reaston | H04W 4/80 455/41.2 |
| 2015/0312655 A1 | 10/2015 | Balakrishnan | |
| 2019/0261069 A1 | 8/2019 | Balakrishnan | |

FOREIGN PATENT DOCUMENTS

| | | |
|---|---|---|
| JP | 2009169869 | 7/2009 |
| JP | 2012185537 | 9/2012 |
| WO | WO0171372 | 9/2001 |
| WO | WO20090070347 | 6/2009 |
| WO | WO20120080741 | 6/2012 |
| WO | WO20140081485 | 5/2014 |
| WO | WO20140118563 | 8/2014 |
| WO | WO2014145409 | 9/2014 |
| WO | WO20150070057 | 5/2015 |
| WO | WO20150114384 | 8/2015 |

OTHER PUBLICATIONS

U.S. Appl. No. 16/398,083, filed Apr. 29, 2019—Published 20190261069.
U.S. Appl. No. 16/559,726, filed Sep. 4, 2019—Pending.
1st Examination report dated Feb. 26, 2016 for Australian Patent Application 2014331637.
1st Examination report dated Apr. 12, 2017 for New Zealand Patent Application 706801.
2nd Examination report dated Dec. 16, 2016 for Australian Patent Application 2014331637.
English Translation of Japanese Patent Application JP2000205892, dated Apr. 19, 2018 (16 pages).
English Translation of Notification of Reasons for Refusal, dated Jan. 16, 2018, for Japanese Patent Application 2017-508774 (4 pages).
International Search Report and Written Opinion in International Application PCT/IB2014/065736, dated Mar. 3, 2015, 9 pages.
IPR International Preliminary Report—Written Opinion for PCT/IB2014/065736, dated Nov. 1, 2016.
ISR International Search Report for PCT/IB2014/065736, dated Nov. 1, 2016.
Japanese Notice of Reasons for Refusal in Japanese Application No. 2018211322, dated Jan. 7, 2020, 16 pages.

* cited by examiner

SYSTEM AND METHOD FOR OBTAINING VEHICLE TELEMATICS DATA

RELATED APPLICATIONS

This application is a continuation of U.S. application Ser. No. 16/398,083, filed on Apr. 29, 2019, which is a continuation of U.S. application Ser. No. 14/529,812, filed on Oct. 31, 2014, which claims priority to U.S. Provisional Application No. 61/985,644, filed on Apr. 29, 2014. All of these applications are incorporated here by reference in their entirety.

FIELD OF THE DISCLOSURE

The present application relates to a system and method for obtaining vehicle telematics data.

BACKGROUND

To assess driver risk and to change driving behaviour, insurance companies have started using telematics data. Current deployments use one of the following embedded-hardware-based methods:
1. A "deep install" black box professionally installed in a vehicle that tracks the vehicle's position and acceleration, or
2. An on-board diagnostic (OBD-II) device that connects to the vehicle and acquires information from it.

Because of the high capital and/or operational costs of these hardware-based options, some companies have brought to market a pure smartphone solution recently. This solution requires no black box or OBD hardware device. The advantage of a smartphone-based solution is substantially lower cost compared to hardware alternatives, provided the challenges around data accuracy can be solved. Previous work has shown how to achieve accurate map-based telematics using personal mobile devices for mileage and trajectory estimation (U.S. Pat. No. 8,457,880) and estimation of longitudinal/lateral acceleration and associated events (U.S. patent application Ser. No. 13/832,456 and PCT Application Number: PCT/US14/30174).

A pure smartphone solution, however, does not robustly achieve the following desired properties:
1. Reliable vehicle identification and monitoring only when the user is in a pre-specified set of vehicles.
2. Crash/impact detection.
3. Exact times of vehicle movement.
4. Accurate estimation of acceleration when the user is moving the phone.
5. Working when the user has uninstalled the application, or has not brought the phone into the vehicle.
6. Better estimations of determining when the cell phone is being utilised while driving for calling or texting or accessing chat applications.
7. A precise determination of whether the smartphone logging data belongs to the driver or to a passenger.

Accordingly, there exists a need for an improved system and method for obtaining vehicle telematics data.

SUMMARY

A method and system architecture to combine the best features of a smartphone-based approach together with a lightweight embedded tag hardware is disclosed. The smartphone and tag communicate with each other over low-power wireless while in the vehicle and work in concert to: (1) achieve the high degree of accuracy of an expensive pure hardware solution, (2) provide the features listed above that are difficult or impossible to achieve with a pure smartphone solution, (3) realize a substantially lower cost only modestly higher than that of the pure smartphone solution, (4) avoid the high logistics, hardware and deployment cost inherent in a full GSM/GPS Black box or OBD II solution, while maintaining a high level of data accuracy (5) achieve energy-efficient operation, with the tag capable of operating for several years on a small coin-sized battery, (6) improve smartphone battery life by offloading some sensing functions to the tag, and (7) avoid interference with the vehicle wiring or OBD port.

According to one example embodiment, a sensor tag for obtaining vehicle telematics data includes:
  an accelerometer to measure acceleration of the tag and thereby of the vehicle when the vehicle is moving and to record acceleration data;
  a memory for storing acceleration data; and
  a communication module for short range wireless communication with a mobile communications device located in the vehicle via a short range wireless communications protocol, the communication module transmitting acceleration data to the mobile communications device.

Communication between the tag and mobile communications device preferably occurs automatically without manual intervention or configuration The tag is not connected to the vehicle's computer or power systems.

The short range wireless communications protocol may be Bluetooth.

The mobile communications device may be a mobile telephone.

In one example, the communication module also transmits time data associated with the acceleration data to the mobile communications device.

The communication module may further transmit a tag identity and a user identity to the mobile communications device.

The tag may include a tamper detection mechanism.

The tag includes a crash/impact detection mechanism.

The tag may include sensors other than accelerometer, such as gyroscope, barometer, compass, and position sensors.

The tag signs and may optionally encrypt any data sent to the mobile communications device in a manner that the mobile communications device cannot tamper with the data undetected; with encryption, the data is kept confidential from the mobile communications device. The mobile communications device forwards the data to the server.

The server signs and may optionally encrypt any data sent to the mobile device in a manner that the mobile device cannot tamper with the data undetected; with encryption, the data is kept confidential from the mobile device. The mobile device forwards the data to the tag. Such data includes parameters, configuration information, and code (for over-the-air firmware upgrade).

According to another example embodiment, a mobile communications device including:
  a display for displaying information to a user;
  a user interface for receiving inputs from a user;
  a location module for determining and recording location data regarding the location of the mobile communications device;
  a processor with an executable application running thereon to combine the received acceleration data with the location data so that the acceleration and position of the vehicle at a particular point in time is known; and a communications module for receiving acceleration data from a tag connected to a vehicle and for transmitting the combined acceleration data and the location data to a server via a mobile communications network.

The location module may be a GPS module.

The communications module is able to communication with the tag via a short range wireless communications protocol such as Bluetooth.

In one example, the communication module also receives time data associated with the acceleration data from the tag.

The communication module may further receive a tag identity and a user identity from the tag.

In addition, the tag may include a tamper detection mechanism.

DESCRIPTION OF EMBODIMENTS

The system and methodology described herein relate to obtaining vehicle telematics data.

Referring to the accompanying Figures, an untethered, battery-powered sensor tag 10 is affixed to a motor vehicle 12. It is envisioned that the tag 10 will be placed on the windscreen or some other rigid part of the vehicle 12.

Figure 2:
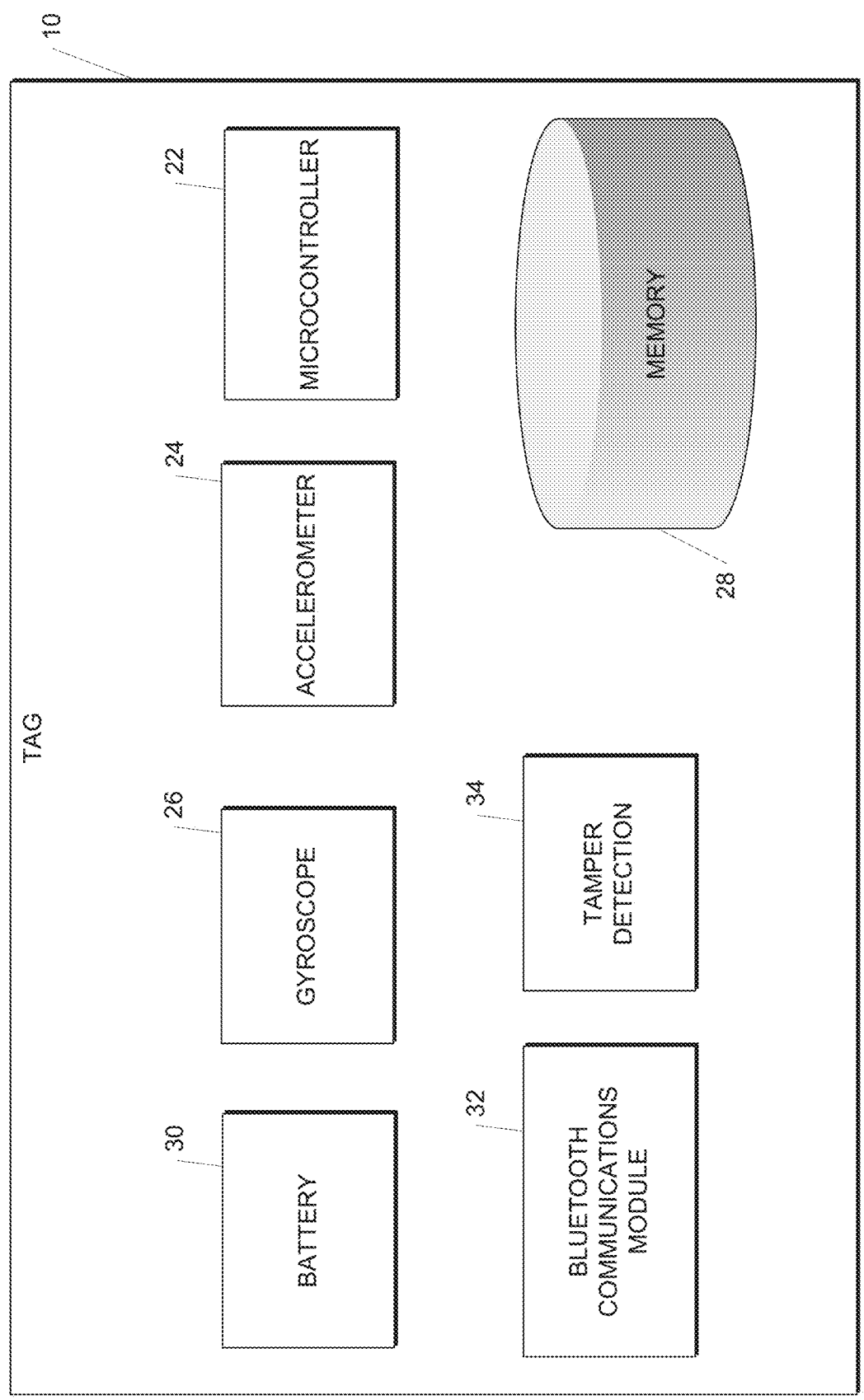
FIG. 2 is a block diagram illustrating an example tag to be installed on a vehicle in more detail.

Referring to FIG. 2, the tag 10 contains a processor in the form of a microcontroller 22 capable of executing programmed instructions ("firmware"), which controls the operation of the various other components of the tag. The components include a low-power wireless communication module 32 to communicate with a mobile communications device 14 in the vehicle.

It will be appreciated that the mobile communications device 14 could be any suitable mobile communications device such as a mobile telephone, a tablet, an iPod or any other suitable communications device.

In any event, the components include one or more sensors, specifically a three-axis accelerometer 24, and optionally one or more among a three-axis gyroscope 26, a light sensor, a pressure sensor, and a magnetometer.

The accelerometer 24 measures the acceleration of the tag 10 and thereby of the vehicle 12 when the vehicle is moving and reports the data to the microcontroller 22. The accelerometer and other sensors provide digital output generally via a serial interface standard.

In the preferred embodiment all the components in the tag are low-power devices, so that one or two small coin-cell batteries suffice for the tag to run for several thousands of hours of driving time (multiple years of operation). The firmware of the microcontroller 22 on the tag 10 records telematics data mostly only when the vehicle is moving. When the vehicle is not moving, the components of the tag 10 are in powered-down or in an ultra-low-power idle state. An "acceleration state machine" controls the different states of the tag 10.

In the illustrated example the short range wireless communications protocol is Bluetooth, but any low-power communication could be used. Bluetooth Low Energy (BLE) meets the desired power requirements and is widely available on commodity smartphone devices. In an example embodiment the microcontroller 22 and Bluetooth communications module 32 including antenna and crystal are combined in a single chip.

The tag 10 records acceleration and other sensor data. It streams that data to the mobile device 14 over the short-range wireless communication link, which will in turn process that data and transmit at least a portion of the received and processed data via a wireless communications network 16 such as 802.11 (WiFi) or cellular network to a server 18 with an associated database 20.

The tag 10 includes a memory 28 in the form of a flash storage, for example using a serial flash memory. The memory 28 stores data about trip start/end times, acceleration and other sensor data including telematic events detected by the firmware such as hard braking, accelerations, and turns, unexpected movements of the tag, collisions or crashes, and debugging logs together with time stamps. The tag 10 also includes random access memory (RAM) used by the firmware and read-only memory (ROM) used to store configuration data and executable instructions.

The tag 10 includes a battery 30 for providing power to the device. The battery may be in a coin cell form factor, standard AAA or AA, or solar. It is important to note that in the preferred embodiment the tag is not tethered to any wired source of power, such as the vehicle's electrical power supply or the vehicle's standard on-board diagnostic (OBD) port. Because it does not have an unbounded source of energy, its operation includes methods to use energy frugally and carefully, as described below.

The advantages of not requiring a tethered power source are that there is no complicated or cumbersome installation procedure as with an installed black box. Plugging the tag into the vehicle's OBD port is also not desirable given that these types of devices could potentially interfere with the vehicle's on-board systems. The capital and operational costs of a telematics system with the untethered tag are considerably lower than black boxes and OBD devices and are more scalable for insurance telematic companies.

The tag 10 includes hardware and firmware instructions on the microcontroller 22 that measure and report the power level of the battery to the mobile device over the low-power wireless communication link. The hardware may be implemented with an intermediary circuit (not shown) connected between the battery and the microcontroller 22 to measure the voltage of the battery. When the battery's energy reserves are found to be lower than a threshold, the user is given a warning on the mobile device in order to warn users when the battery is going low.

In the illustrated example the short range wireless communications protocol is Bluetooth, but any low-power communication could be used. Bluetooth Low Energy (BLE) meets the desired power requirements and is widely available on commodity smartphone devices. In an example embodiment the microcontroller 22 and Bluetooth communications module 32 including antenna and crystal are combined in a single chip.

Figure 3:
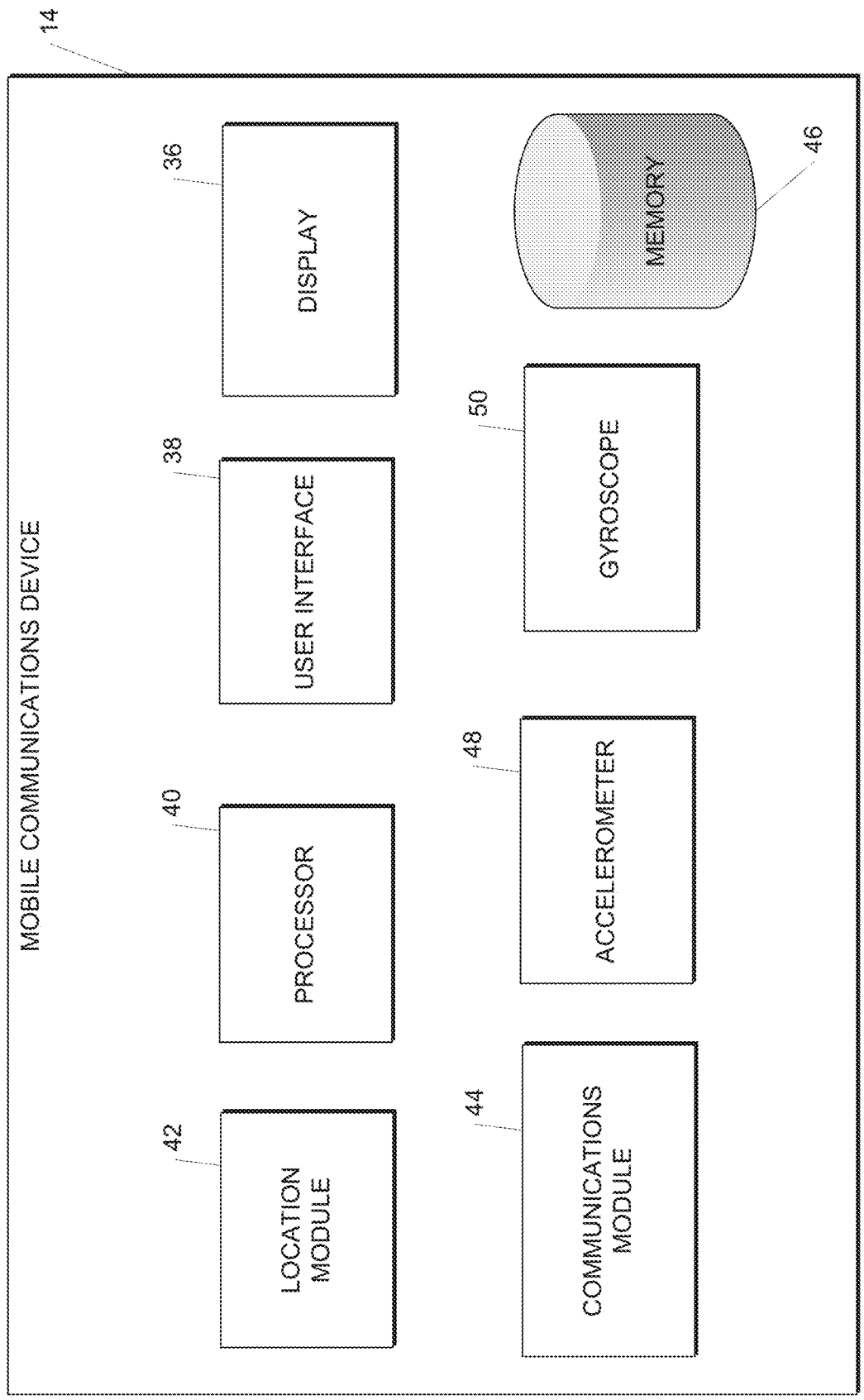
FIG. 3 is a block diagram illustrating an example mobile communications device in more detail.

Referring to FIG. 3, the mobile communications device (smartphone) 14 includes a display 36 by which information is displayed to a user of the device 14. A user interface 38 receives inputs from the user. The user interface 38 could be a keypad or a touch screen, for example.

The device 14 includes a processor 40 connected to the other illustrated modules to control the operation of the device 14. The device also includes a location module 42.

The location module 42 is used to determine the location of the mobile communications device 14 and thereby the position of the vehicle in which the mobile communications device 14 is located.

The location module 42 includes one or more position sensors such as the Global Positioning System (GPS) as well as WiFi-based location or cellular location sensors are used for an application on the mobile device to obtain position and velocity information. Other sensors such as a gyroscope and acceleration sensors on the mobile device may also be used to gather information during a trip.

The device includes an on-board memory 46 as well as a communications module 44, which allows the device to communicate both with the tag 10 and using one or more the mobile communication networks 16.

To implement the methodologies described, the device 14 will include an executable application that is able to execute on the device.

Figure 1:
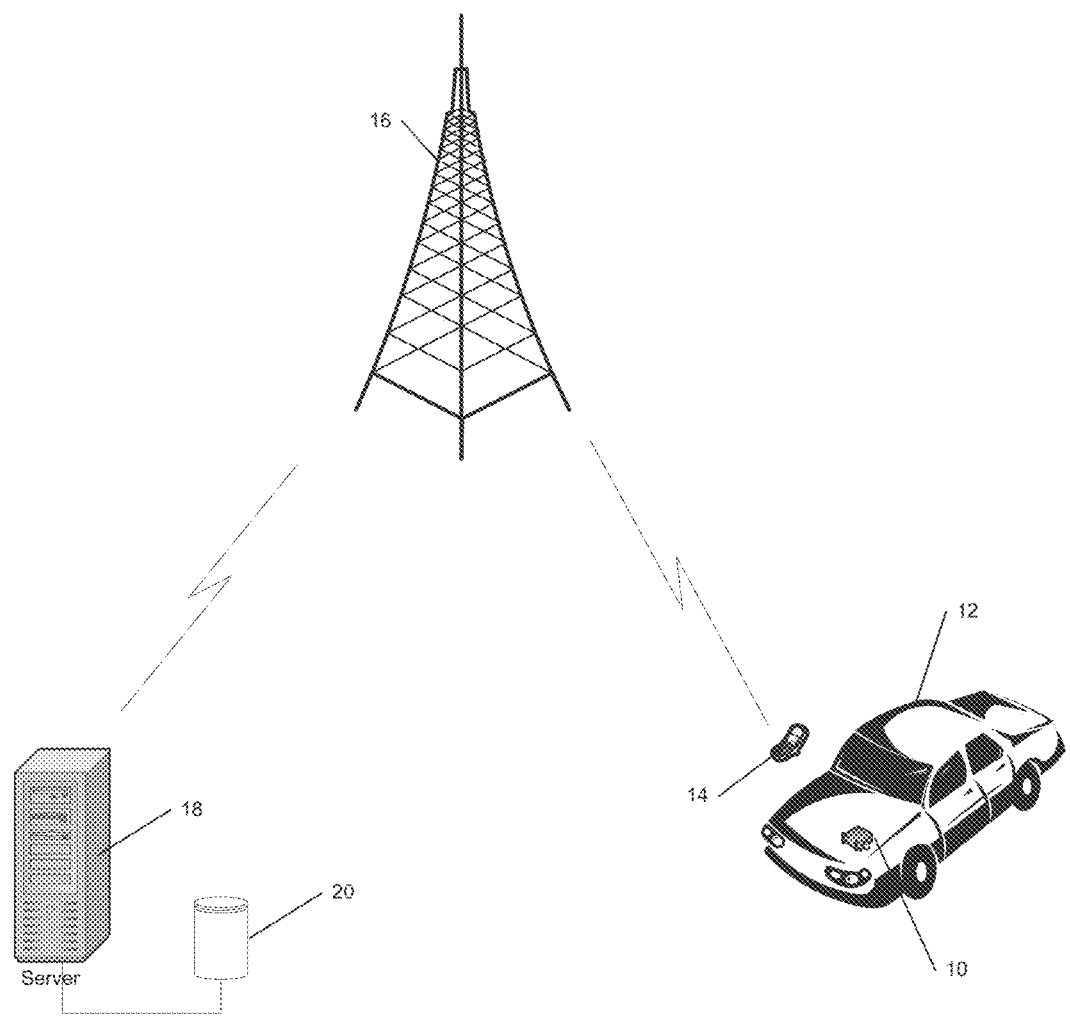
FIG. 1 is an example system for implementing a vehicle telematics methodology.

Described below are some key aspects of the operation of the system, including:
  Tag installation and initialization
  Tag-smartphone synchronization and communication protocols
  Collision and crash detection
  End-to-end security between tag and server, communicating via an untrusted smartphone
  Detection of tag tampering and tag movement relative to vehicle
  Orientation Algorithm
  The Functions of the Server Describing firstly the tag 10 installation and initialization, the tag 10 is installed into a motor vehicle 12. As mentioned above, this could be accomplished in any one of a number of ways including affixing the tag to the windscreen or to any other rigid part of the motor vehicle as illustrated in FIG. 1, for example.

Figure 4:
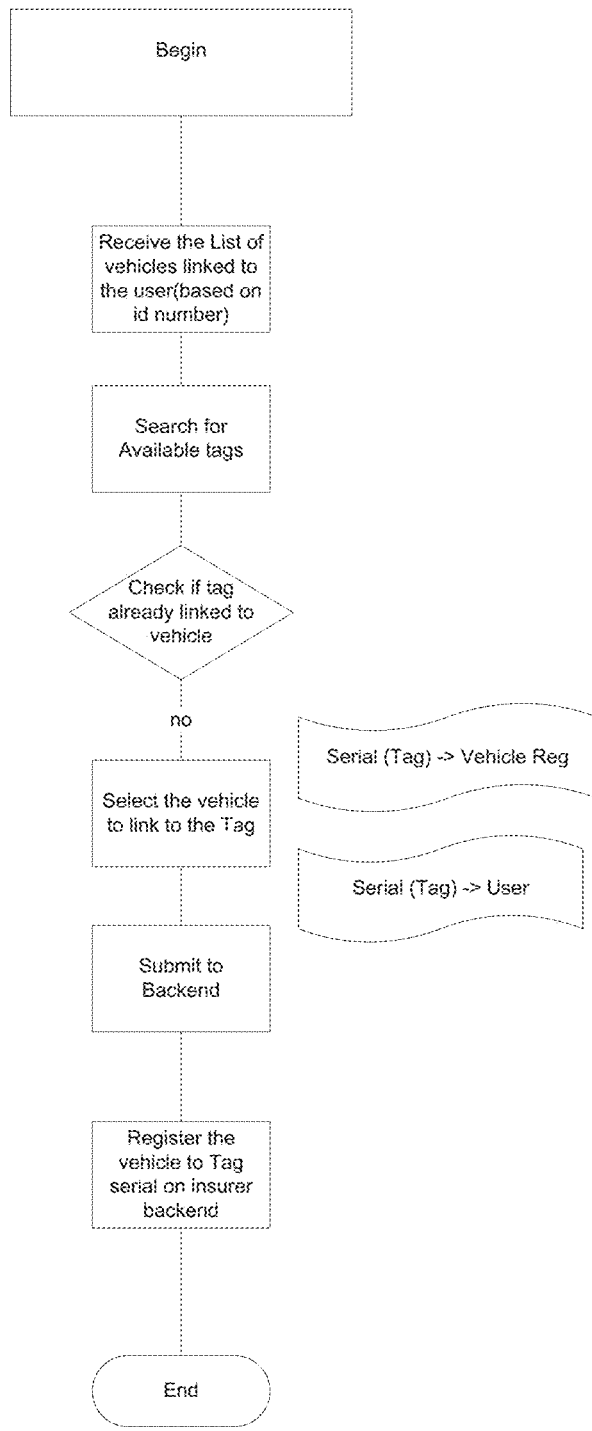
FIGS. 4-8 are block diagrams illustrating an example vehicle telematics monitoring method.

In order to assign the tag 10 to the correct vehicle an initializing phase needs to occur. An example of this is illustrated in FIG. 4.

After fitment the user (who may or may not be the vehicle's owner or driver) will be able to open the executable application on the mobile communications device 14 and start the initialization phase, which will search for a tag 10 in the vicinity.

A list of tags 10 in the vicinity will be displayed to the user via the display 36 and the user will then be able to select the correct tag 10 via the user interface 38.

The user will then be able to select a vehicle 12 to be linked to the selected tag 10.

Where it is known what vehicles the user owns, a list of the vehicles may be provided via the display 36.

In any event, the selected vehicle 12 and the identity of the tag 10 secured to the vehicle 12 are submitted to the server 18 together with a user ID, typically via the communications module 44 and the mobile communications network 16.

Changes or movement of the tag to other vehicles will require the user to have the tag moved to a new vehicle and linked to the new vehicle, or re-linked to the existing vehicle. This can be performed via the system server A noteworthy aspect of the system is that there is no Bluetooth pairing step between the phone and the tag required. Moreover, the administrator can specify via a server-side configuration which set of tags any given smartphone application instance will be able to connect to and transfer data bi-directionally between the server and tag. It is possible for this set to be "all tags", which means that the app instance can connect to any active tag. However, the set of tags whose data is made visible on the app may be restricted only to those tags that are linked to the user on the server.

For example suppose Vehicle V1 belongs to a first user, who also owns smartphone app A1, is linked to Tag T1. Then, if smartphone app A2 belonging to a different user travels in Vehicle V1, depending on the server-side configuration, tag T1 and app A2 may connect with each other and exchange data. But even if that happens, the data belonging to this trip will be made visible on app A1 belonging to the first user and the data used to assess the driving usage of vehicle V1, and not a different vehicle belonging to the second user.

Different combinations of which tags are allowed to connect to which smartphone instances are possible, and configurable entirely on the server side without requiring any changes to the software running the mobile communication device or the tag.

When the user begins driving the vehicle 12, the tag 10 will advertise itself on the short range wireless communications network, such as Bluetooth. Any mobile device running the corresponding mobile application may see the advertisement, and potentially any mobile devices with the application depending on the policy deployed (application) will be able to connect to the tag.

In order for this to occur, the executable application referred to above needs to be executed by the user on the mobile communications device 14.

In terms of the tag-phone synchronization and communication, the firmware on the tag 10 implements the following states to achieve battery-efficient synchronization and communication between the tag and mobile device (smartphone). The main states in this state machine are: VERIFY, ADVERTISE, and CONNECTED. In the VERIFY state, the tag's components are powered down, except a low-power acceleration chip forming part of accelerometer 24, which gathers acceleration data at a specified frequency (typically between 5 and 50 Hz depending on hardware and software capabilities), and periodically wakes-up the processor (e.g., once every second or two) using an interrupt. Equivalently, the processor may poll periodically for the acceleration data. The processor then executes the state machine implemented in the firmware to determine if the state should remain in the VERIFY state, or if it should transition to ADVERTISE.

This determination is made according to whether the vehicle has been moving for a configurable period of time. If it has not been moving for a specified period of time, the state remains VERIFY; otherwise, it transitions to ADVERTISE. A variety of statistical methods operating over the collected acceleration samples may be used to make this determination. For example, if acceleration data is gathered at 10 Hz and the processor is interrupted every 2 seconds, 20 samples of three-axis accelerometer data are processed to make the determination. One approach to rest determination is to compute the maximum absolute value of the difference from the mean of the values in each acceleration component. If the maximum in any of the three components is above a configurable threshold A for a configurable amount of time T1, then transition to the ADVERTISE state; otherwise, remain in VERIFY. The parameters A and T1 are tunable values in the method.

An important point is that advertisements from the tag, which consume energy, occur only when the vehicle is deemed to be moving, and stop when a mobile device connects. Such motion-triggered advertisements conserve battery resources. In certain situations the tag may be capable of connecting to multiple mobile devices, in which case the advertisements may continue upon connection to one or more other mobile devices. Advertisements may be terminated after several minutes even if the vehicle is still moving and no mobile device has connected and the tag may then return to the VERIFY state for a certain configurable time.

Figure 6:
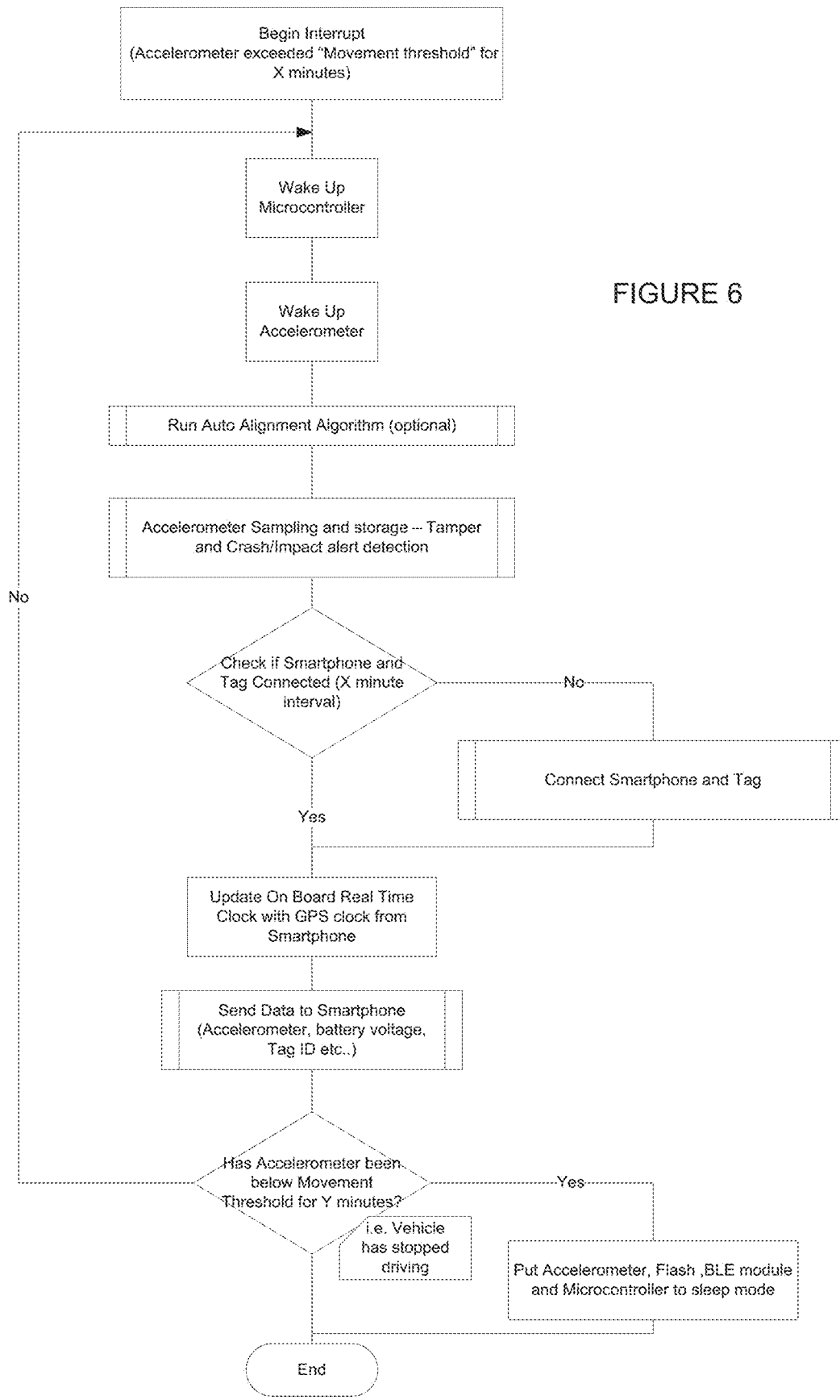

Referring to FIG. 6, the tag 10 is woken up by the accelerometer exceeding a certain measurement threshold for a certain period of time. This is important functionality as it extends the life of the battery 30 by keeping the tag in an ultra-low-power sleep mode when the vehicle is not moving.

Upon transitioning to the ADVERTISE state, the tag considers a trip to have started and starts logging the acceleration data to its RAM. It may also write this data to persistent storage (e.g., Flash). In an embodiment with Bluetooth Low Energy communication, the tag advertises its presence as a Bluetooth peripheral. Alternatively, the tag may be configured as a Bluetooth central node, and the phone a peripheral, in which case the transition to the ADVERTISE state causes the tag to start looking for advertisements from the phone. (In this configuration the phone would periodically advertise its presence).

Figure 5:
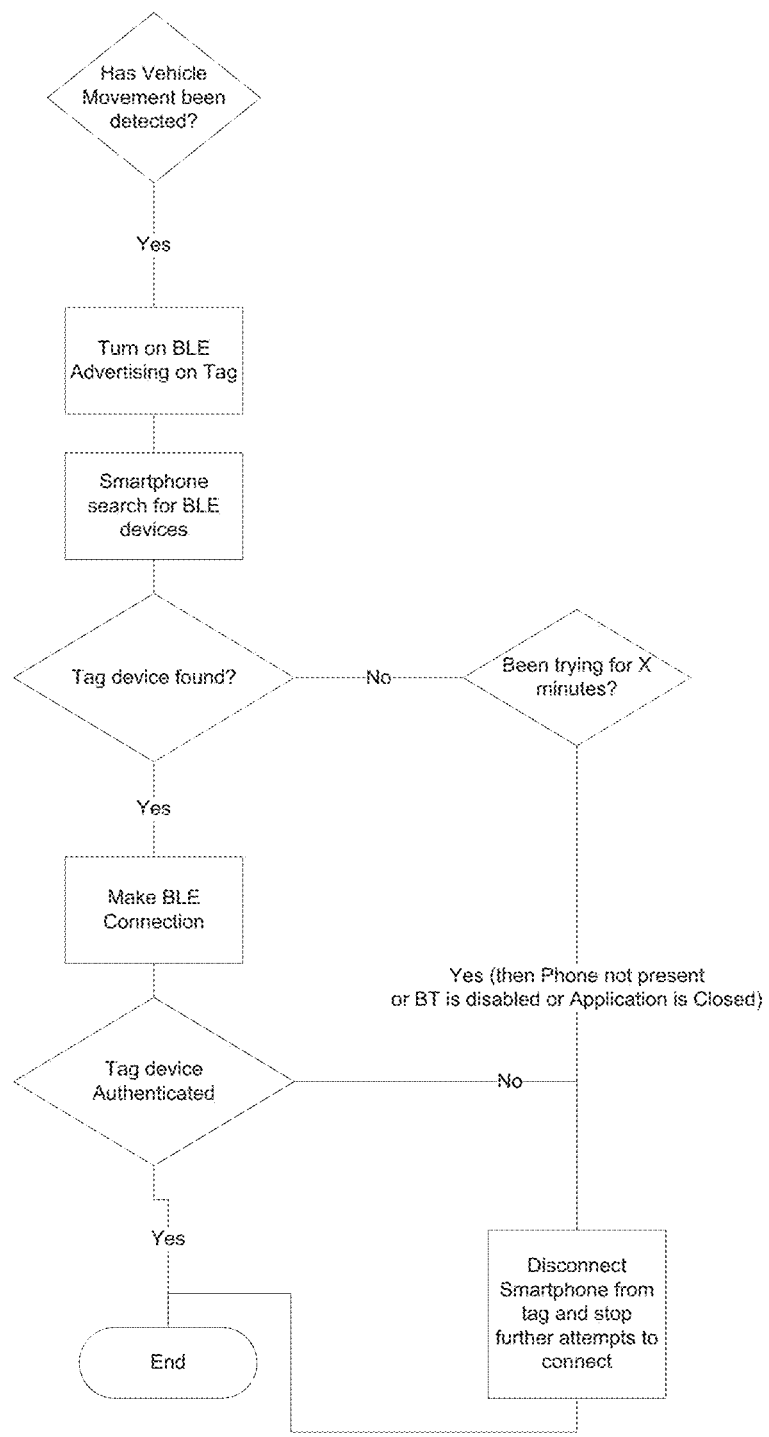

Referring to FIG. 5, the block "turn on advertising of BLE" relates to Bluetooth Low energy which can have an advertising state turned on and off, as is well known in the art. In advertising mode the chip will typically use more battery power and hence this should be used conservatively. Therefore, the tag 10 in an example embodiment will only start advertising once motion is detected to preserve the battery life on the tag 10.

Similarly, if the Bluetooth module on the mobile communications device 14 is ON then the device 14 this will connect automatically each time the smart phone is in the vicinity of the tag 10 and the vehicle starts driving. If the Bluetooth module is off, then a "pop up" will be displayed to the user on the display 30 prompting the user to enable Bluetooth.

Once the executable application on the mobile communications device 14 has identified the tag 10 then a communications session is set up between the tag 10 and mobile communications device 14 via communications modules 32 and 44 respectively.

Thus it should be noted that the tag 10 is in a dormant/sleep state while the vehicle 12 is not driving. Once the vehicle 12 starts driving, the tag 10 awakens and starts recording accelerometer data. That happens regardless of whether the mobile device is in the vehicle or not. The memory therefore needs to be large enough to store enough data to handle several hours of driving in the absence of the user's mobile device 14. The number of hours of recordable data will vary depending on the size of the memory 28.

Upon hearing a suitable advertisement, the central node connects to the peripheral. In the example embodiment, the phone (central) initiates a connection to the tag (peripheral). Upon a successful connection, the tag transitions to the CONNECTED state.

In the CONNECTED state, the tag and phone communicate with each other. This communication involves reliable transmission of any data previously logged in the storage of the tag, including information about previous trips, previously detected events (such as hard braking, acceleration, collisions, tampering, etc.), debugging or diagnostic information, and the like. After the reliable transmission of this information using a protocol where the phone acknowledges reception, the tag starts streaming live acceleration and other sensor data to the phone.

The mobile communications device 14 will transmit this combined data (sensor data from the tag 10 and GPS and/or additional sensor data such as position, gyroscope, acceleration from the mobile communications device) to the backend server 18.

An example data packet may consist of:
Timestamp
The tag's X, Y, Z component of acceleration
Additional sensor data from the tag (e.g., gyroscope)
One or more streams of sensor data from the mobile device such as the GPS positions, speed, and heading; network location samples; X, Y, Z components of the accelerometer; 3-axis gyroscope values, magnetometer data In addition, the data transmitted includes a User ID, Tag ID, and Application ID.

In the example embodiment both the reliable and streaming of this data are done over the Bluetooth, low energy link layer protocol. They could use Bluetooth's notification and indication capabilities for this purpose. It should be apparent that any other wireless communication medium and link layer protocol could also be used, including but not limited to Bluetooth (non-low-energy), WiFi, WiFi-Direct, and the like.

Once the tag 10 and the mobile device 14 have connected and the tag is in CONNECTED state, in order to further preserve power advertisements stop, or are sent less frequently than in ADVERTISE state. Moreover, the streaming of sensor data does not require the short-range Bluetooth radio to be on continuously. The radio is turned on only just before the scheduled transmission. For example, the radio may be turned on every second to burst a small number of packets, then be turned off.

The tag remains in the CONNECTED state until either the connection terminates because the tag and phone are no longer in communication range, or until the tag's firmware determines that the vehicle has not been moving for some period of time T2. In either case, the tag transitions to the ADVERTISE state for a period of time T3. The functions here are the same as in the ADVERTISE state described above. If the vehicle remains at rest for T4, the tag transitions to the VERIFY state, where most of the components are powered down.

Note that the mobile device processes and communicates all information received from the tag to the server.

If no tag 10 is located within a predetermined amount of time T5 and the vehicle is moving the mobile communications device 14 may continue to record only GPS and/or its own sensor data.

In one example embodiment, the user can select whether to transmit the data from the mobile communications device 14 to the backend server 18 by way of cellular data or if the data should be stored and transmitted only when the mobile communications device 14 comes into range of a short-range wireless LAN network such as WiFi.

If the setting on the mobile communications device is to not allow for use of mobile cellular data, then the said data will only be transmitted when the device is connected to a WiFi network.

In both the case of the cellular transmission and the WiFi transmission when the data is received on the servers the server side software will process this data and return processed or "clean" data back to the mobile communications device to update its currently stored trip and driver behaviour data for display back to the user. Such clean data involves the ability on the backend servers to determine the difference between walking data and driving data, and the types of transport being utilized such as a train or bus.

Describing now the collision and crash detection functionality of the system, any significant acceleration event whose magnitude exceeds a specified configurable threshold A2 is logged in the persistent storage on the tag. Such events are considered potential collisions and are immediately communicated to the mobile communications device using the communication protocol described above (in the CONNECTED state).

Figure 7:
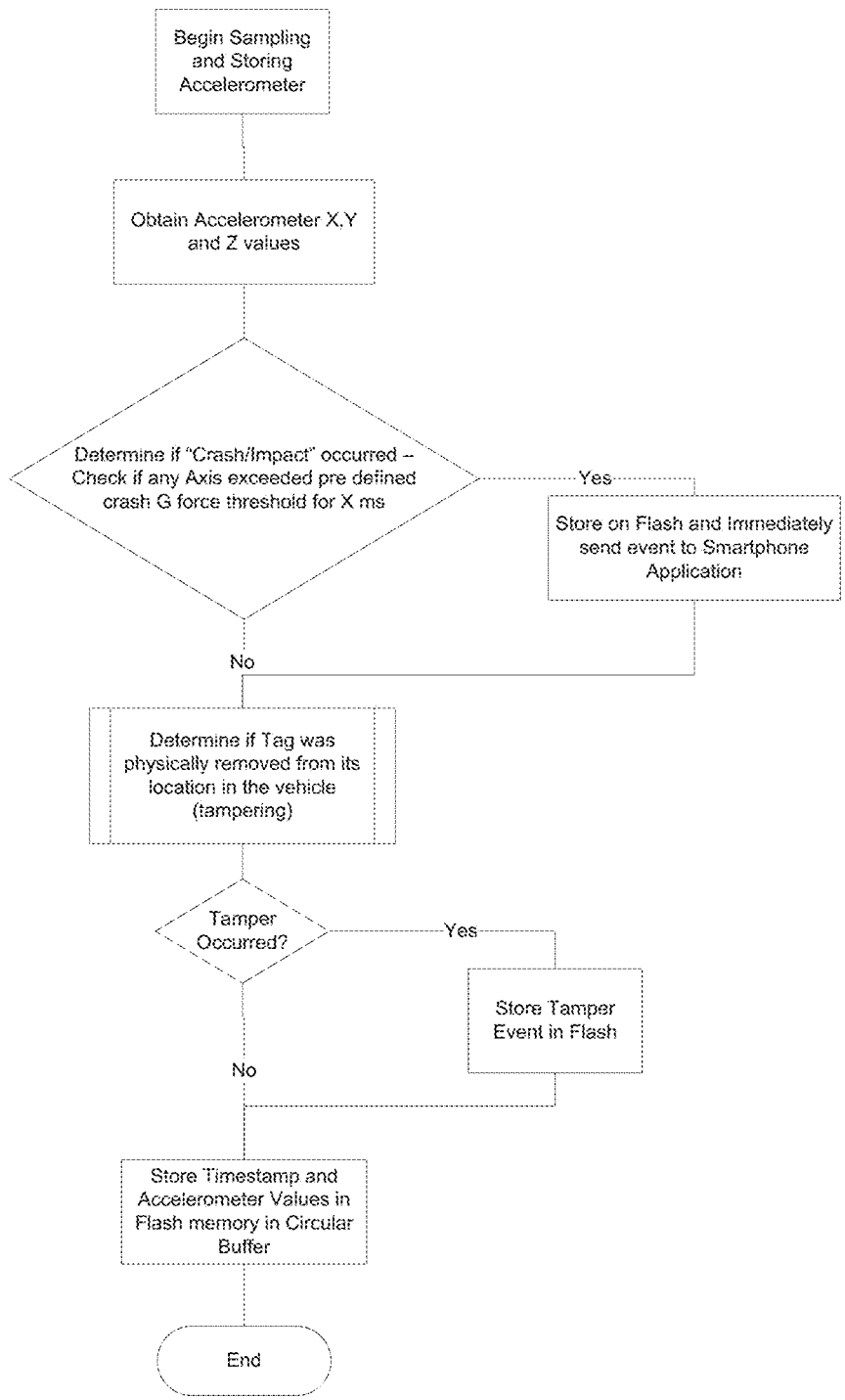
Figure 8:
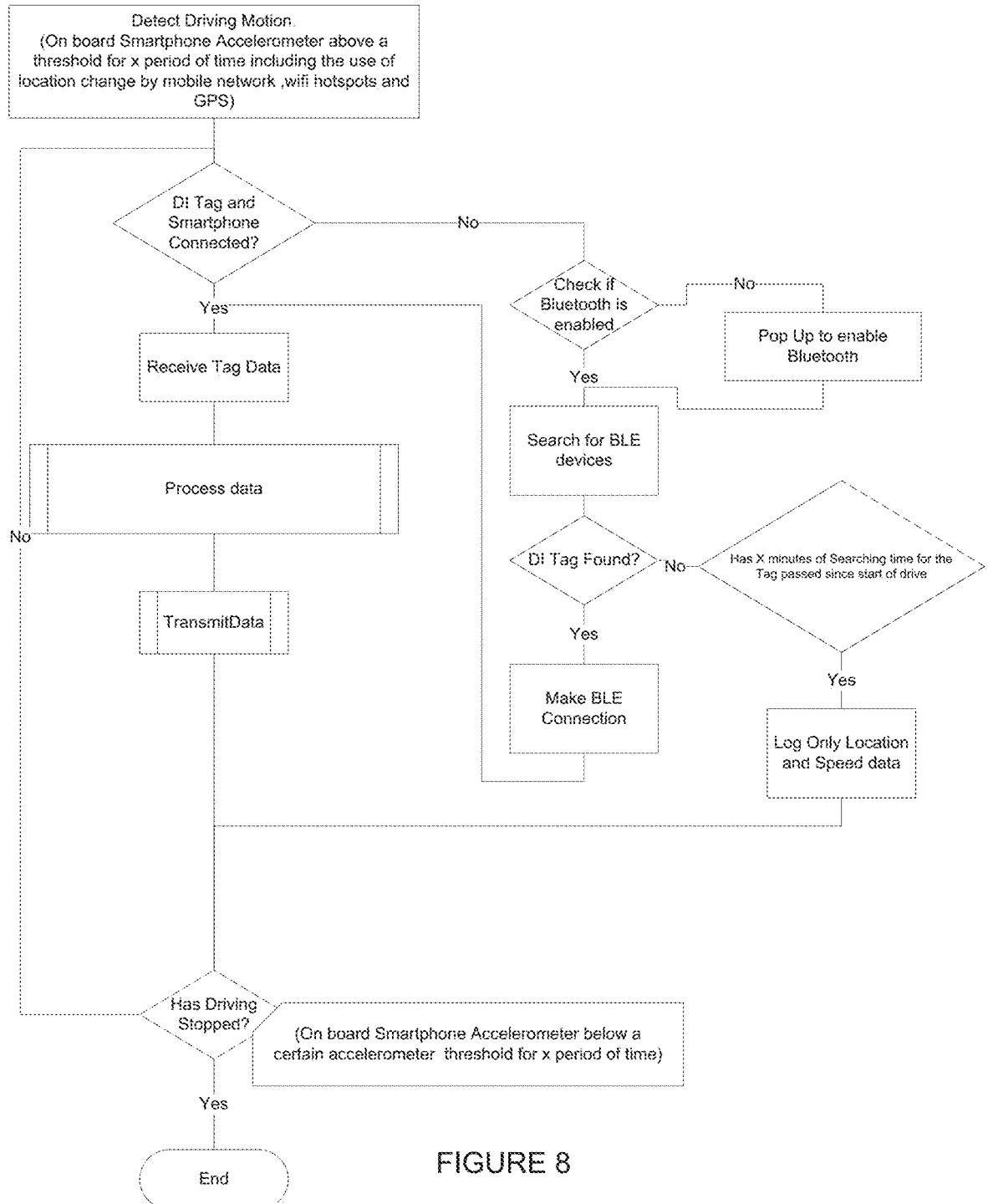

Referring to FIG. 7, the microcontroller 22 samples and stores the accelerometer 24 readings including the accelerometer X, Y, and Z values. The microcontroller 22 determines from the accelerometer values if a crash/impact has occurred by checking if any of the X, Y or Z values or a combination of the values, e.g., $(X^2+Y^2+Z^2)$, exceeds a predetermined threshold for a predetermined time period.

One method is to derive the acceleration components in the vertical (gravity) direction and in the direction perpendicular to gravity, and then consider an impact to have occurred if one or both components exceeds specified threshold values. Estimating the direction of gravity may be done in a number of ways, including using a low-pass filter over the entire stream of acceleration data observed thus far over the lifetime of the drive or even longer.

If a crash/impact event has occurred then data from the accelerometer 24 is immediately stored in the memory 28 and simultaneously transmitted via the communications module 32 to the mobile communications device 14. The mobile communications device 14 may augment the data from the tag with its own sensor data such as position and velocity and transmit that to the server in real time.

Additional sensor information from the near past and near future gathered from the sensors on the mobile communication device (position, velocity) can also be transmitted in a crash/impact detection scenario.

In an example embodiment, the mobile device (smartphone) 14 is an untrusted device. That is, the telematics data produced by the tag traverses the mobile device en route to the server, but neither the tag nor the server may trust the mobile device, which is owned by a potentially untrusted user. The invention includes a method by which the authenticity of the data and messages sent by the tag can be verified by the server, and vice versa.

The traditional approach toward this problem is to use public key cryptography: the server and the tag each have a well-known public key, with a corresponding secret private key known only to the owner of the key. By digitally signing each message with its private key, an entity can verify that a recipient can verify the authenticity of the message. Because of the computational constraints on the tag, the invention uses symmetric keys, rather than more expensive public key operations.

Every tag has a secret internal ID number (S_ID) built into the tag hardware (chip). The mapping between S_ID and the device ID (MAC address) is known to the server.

All data sent from the tag to the mobile device, to be passed to the server, and sent from the server to the mobile communications device to be passed to the tag (including any acknowledgments and configuration information), they are digitally signed using a secret key derived from S_ID and the device ID. In an example embodiment, define a secret key K=f (S_ID, deviceID); in one embodiment, the function f is a bit-wise XOR operation. Each message includes an authentication token based on a one-way hash (e.g., SHA-1) of the content appended with K. ACK messages from the server also contain an authentication token based on a hash of K, so they are assured to come from the server (the intermediary mobile device never sees either S_ID or K).

When an acknowledgment from the server is received, the acknowledged data is purged from the tag's flash; no data purging occurs until a signed ACK for that data is received. In particular, data acknowledged by the mobile device in the vehicle is not purged from the tag: an authenticated end-to-end acknowledgment from the server is required. As described earlier, these logs include event logs, trip duration logs, diagnostic logs, etc.

Note that when acceleration and other sensor data is streamed to the mobile device from the tag, it may be discarded by the untrusted mobile application, but it cannot be tampered with or changed without detection by the server. If a rogue application discards the data, the server will not know, but the symptom will be the same as a trip in the trip duration log with no corresponding acceleration data. If a rogue application tries to "eat up" trip log data as well, any subsequent trip showing up at the server will inform the server of missing intermediate trips and missing data, conveying information that something is amiss and broken. That is enough to take corrective measures, including informing the user of possible problems or potentially malicious behavior.

Like streamed acceleration events, crash or live event alerts are also sent to the phone without an end-to-end acknowledgement from the server, but they are sent signed so they can be verified as authentic. Note that the communication protocol between the tag and mobile device includes link-layer retries, so they are likely to be received at the server as long as the mobile device functions correctly (the data from the mobile device to the server is sent using a reliable protocol like TCP). It should be noted that if confidentiality is desired in addition to authenticity, the secret key K can be used to encrypt the data.

Clock updates from the server to the tag can occur whenever phone is online. To update the clock, the phone requests a nonce (a one-time message) from tag. The phone sends the nonce to the server. The server constructs a time token containing the current time and an authenticator based on a hash of the nonce and the key K. The tag sets its clock only if the authenticator verifies correctly.

This clock sync is important so that the accelerometer data stored in the memory 28 can later be tied up with GPS data measured by the executable application running on the mobile communications device 14 and the backend server data.

In the event that the mobile communications device 14 is unable to connect to the tag 10 and the vehicle is moving the smartphone can be configured to gather and deliver its own sensor data to the server, or to not do so.

The tag 10 includes a tamper detection mechanism 34. The anti-tamper mechanism uses one or both of the following two methods.

The first method uses the accelerometer and using an orientation algorithm where the tag 10 once secured to the vehicle will have knowledge of its correction angle in relation to the vehicle travelling direction. This algorithm computes the rotation matrix that converts from the axes of the tag's accelerometer to the axes corresponding to the vehicle's frame of reference. Should the tag 19 experience any sudden changes in this orientation the most likely reason is a movement of the affixed tag, which would be considered tampering. This tampering event will be recorded in the tag flash memory and transmitted securely to the backend server. The detection of such tampering reduces potential fraud.

The second method uses a light sensor chip included in the tag 10, which will be covered by the tag housing. When removing the tag from its intended position, the piece of the housing will be broken, and the light sensor will be exposed. This, in turn, will trigger a tamper event, which will be transmitted to the flash memory 28 and then sent via the mobile device 14 to the server 18.

In any event, the microcontroller 22 runs an orientation algorithm that aligns the axes of the accelerometer of the tag 10 to the coordinate system of the vehicle 12 regardless of how the tag 10 is placed in the vehicle. This orientation algorithm can be run on the tag 10 or the mobile device 14 or the back-end server. The computed orientation is configured on the tag, enabling the tag to detect events using in its him him him him him him him him him him him him him him him him him him only its own computation.

In one example embodiment, the orientation algorithm will run when the vehicle is in motion until the point that the microcontroller 22 is convinced that it is correctly aligned with the vehicle. Once this occurs the microcontroller 22 will not run the algorithm again unless it is physically removed from its placement and replaced on the vehicle.

The combination of the sensor tag and smartphone sensor data may be used as follows to determine whether the smartphone is on the driver's or passenger's side of the vehicle. The method requires knowledge of where in the vehicle the tag is affixed, which is easy to record in a database. The method uses the property that the centripetal acceleration experienced by any object depends on the radius of the turn being made, in the frame of reference of the car. This information may be derived using the method disclosed in U.S. patent application Ser. No. 13/832,456 and PCT Application Number: PCT/US14/30174.

Specifically, this acceleration is equal to the product of the radius of the turn and the square of the angular velocity. Because angles are swept at the same rate as observed anywhere in the turning vehicle, the acceleration experienced depends on the radius alone. By knowing the position of the tag and comparing the magnitudes of the derived lateral (centripetal) acceleration between the tag and smartphone for the right-bearing and left-bearing turns observed during a drive, respectively, an estimate of the placement of the phone in different time segments during a drive (to account for the possible change in placement of the phone during a drive) can be obtained.

With respect to distinguishing whether the phone is on the front or back seat, the signal strength of the radio transmissions from the tag is available on the smartphone. Knowing the tag's position enables such an estimate to be obtained as long as the tag is not equi-distant from the front and back seats. For example, a tag affixed to the front or rear windshield would provide the required degree of demarcation.

Figure 9:
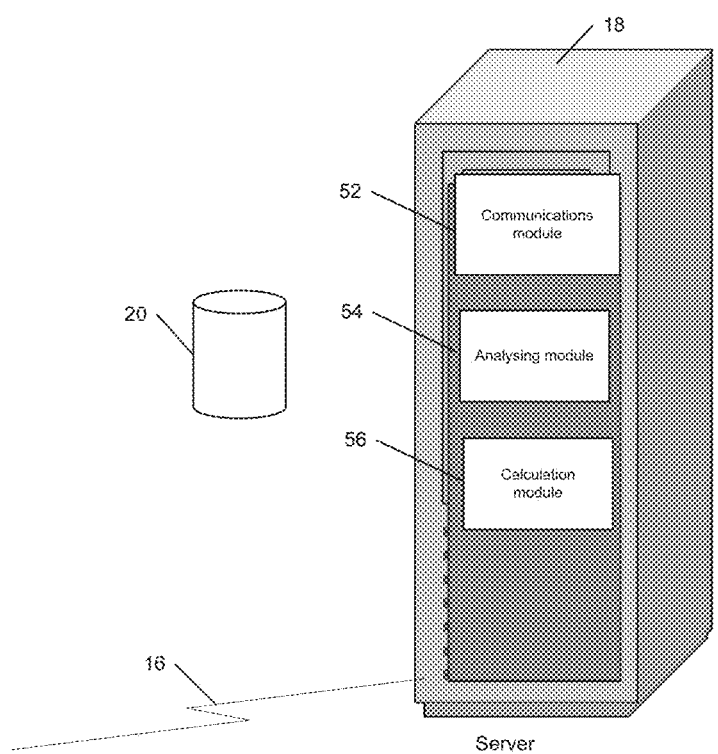
FIG. 9 shows an example server from FIG. 1 in more detail.

Referring to FIG. 9, the server 18 includes a number of modules to implement the present invention and the associated memory 20.

In one example embodiment, the modules described below may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present disclosure are not limited to such architecture, and could equally well find application in a distributed, or peer-to-peer, architecture system. Thus the modules illustrated could be located on one or more servers operated by one or more institutions.

It will also be appreciated that in any of these cases the modules form a physical apparatus with physical modules specifically for executing the steps of the method described herein.

In any event, a communication module 52 receives data that has been transmitted by the mobile communications device 14.

An analyzing module 54 then analyses the received data to determine driver behaviors.

Finally, in one example application of the abovementioned method and system, a calculation module 56 uses the analyzed data to calculate a reward for the user such as reduced premiums on an insurance plan for the motor vehicle.

The invention claimed is:

1. A vehicle tag for providing collision information from a vehicle to a server, the vehicle tag being configured to
   (a) be affixed mechanically to, but not require connection electrically to, the vehicle,
   (b) while the vehicle is being driven on trips, sense acceleration of the vehicle,
   (c) generate time-stamped digital acceleration data for the vehicle based on the sensed acceleration, the time-stamped digital acceleration data including X, Y, and Z acceleration values,
   (d) at times during a trip of the vehicle when a mobile device in the vehicle is available for wireless communication with the vehicle tag, achieve a successful connection between the vehicle tag and the mobile device, by the vehicle tag:
   (x) accepting a connection request initiated from the mobile device in response to the vehicle tag advertising its presence, or
   (y) initiating a connection request to the mobile device in response to the mobile device advertising its presence,
   (e) derive from the X, Y, and Z acceleration values, one or more acceleration components in a direction of gravity and one or more acceleration components in a direction normal to gravity,
   (f) determine a possible occurrence of a collision based on a magnitude of the one or more acceleration components in the direction of gravity and of the one or more acceleration components in the direction normal to gravity relative to a predetermined threshold for a predetermined period of time,
   (g) use the successful connection between the mobile device and the vehicle tag to communicate information about the possible occurrence of the collision from the vehicle tag to the mobile device in the vehicle for augmentation with current, near past, and near future position and velocity data from at least one sensor of the mobile device and for communication of the augmented information to the server,
   (h) be in a low-power mode until the sensed acceleration data exceeds a threshold for a certain period of time, and (i) revert to a low-power mode when the sensed acceleration data is lower than a threshold for a certain period of time.

2. The vehicle tag of claim 1 configured to store the generated time-stamped digital acceleration data at the vehicle tag.

3. The vehicle tag of claim 2 configured to log the possible occurrence of the collision based on the generated time-stamped digital acceleration data.

4. The vehicle tag of claim 2 configured to remove the generated time-stamped digital acceleration data from storage at the vehicle tag in response to an acknowledgement by the server received from the mobile device.

5. The vehicle tag of claim 4 in which the acknowledgement comprises an acknowledgement from the server that the server has received the information about the possible occurrence of the collision from the tag.

6. The vehicle tag of claim 4 in which the acknowledgement is signed by the server.

7. The vehicle tag of claim 1 configured to sign the information about the possible occurrence of the collision communicated from the vehicle tag to the mobile device.

8. The vehicle tag of claim 1 configured to communicate the information about the possible occurrence of the collision without an acknowledgment from the server.

9. The vehicle tag of claim 1 in which the connection between the mobile device and the vehicle tag is based on Bluetooth.

10. The vehicle tag of claim 1 belonging to a particular set of tags authorized to make a connection with a given instance of an app running on the mobile device and to transfer data between the server and the vehicle tag.

11. The vehicle tag of claim 1 belonging to a particular set of tags that are associated, at the server, with a user of the mobile device.

12. The vehicle tag of claim 11 in which data produced by the tags of the particular set can be made visible by an app running on the mobile device.

13. The tag of claim 1 configured to store information about orientations of the vehicle tag with respect to the vehicle.

* * * * *

UNITED STATES PATENT AND TRADEMARK OFFICE
CERTIFICATE OF CORRECTION

PATENT NO. : 11,082,758 B2
APPLICATION NO. : 16/559726
DATED : August 3, 2021
INVENTOR(S) : Hari Balakrishnan, Lewis David Girod and Ilan Ossin It is certified that error appears in the above-identified patent and that said Letters Patent is hereby corrected as shown below:

In the Claims

Column 12, Line 66: In Claim 1, before "exceeds" delete "data".

Column 13, Line 2: In Claim 1, before "is" delete "data".

Signed and Sealed this
Twelfth Day of July, 2022

Katherine Kelly Vidal
*Director of the United States Patent and Trademark Office*